W. D. LUTZ.
ELECTROMAGNETIC BRAKE MECHANISM.
APPLICATION FILED DEC. 9, 1909.
1,102,528.  Patented July 7, 1914.
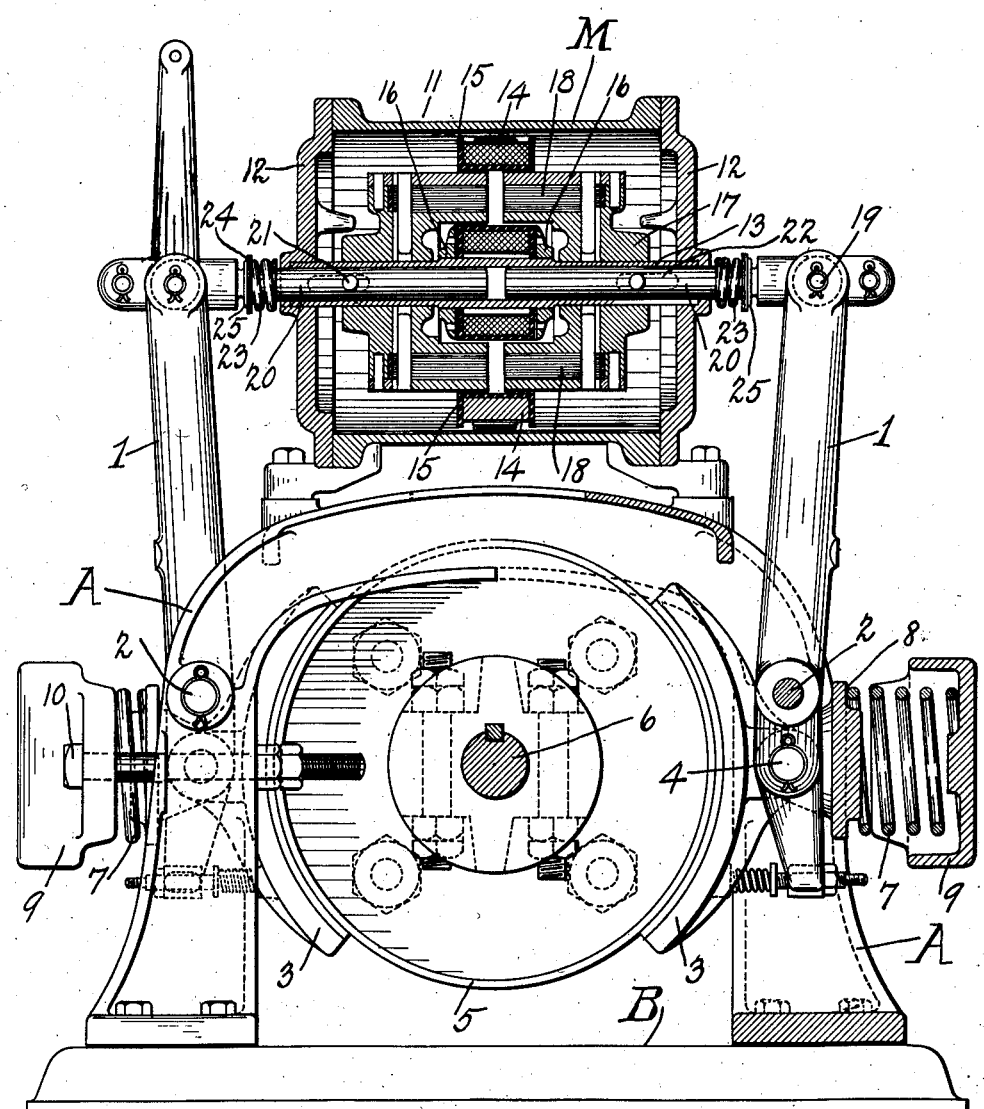
Witnesses:
Inventor:
William D. Lutz
By L. H. Campbell
Attorney

UNITED STATES PATENT OFFICE.

WILLIAM D. LUTZ, OF ALLENDALE, NEW JERSEY, ASSIGNOR TO OTIS ELEVATOR COMPANY, OF JERSEY CITY, NEW JERSEY, A CORPORATION OF NEW JERSEY.

ELECTROMAGNETIC BRAKE MECHANISM.

1,102,528.     Specification of Letters Patent.     Patented July 7, 1914.

Application filed December 9, 1909. Serial No. 532,191.

*To all whom it may concern:*

Be it known that I, WILLIAM D. LUTZ, a citizen of the United States, and residing in the borough of Allendale, in the county of Bergen and State of New Jersey, have invented a new and useful Improvement in Electromagnetic Brake Mechanism, of which the following is a specification.

My invention relates to electromagnetic brake apparatus and has for an object the provision of means for overcoming residual magnetism and thereby preventing the magnet armatures from "sticking" and holding the brake shoes off when the electromagnet is deënergized to permit the brakes to be applied.

It has been found in practice that with brake apparatus of the type herein shown, the residual magnetism is sometimes sufficient to prevent the brake springs from immediately applying the brakes when the magnet is deënergized. This objection is overcome in the present invention by the use of stiff coil springs which are compressed during the final movement of the magnet armatures to attracted position, the tension on these springs being ample to overcome any residual magnetism. These springs at the same time overcome any tendency of either armature to move past the center, and they also prevent the slamming noise ordinarily present in the use of electromagnets of the type shown.

In the accompanying drawings is shown a form of brake apparatus embodying the present invention.

The brake mechanism is supported by a frame A mounted on a base B. Brake levers 1 are pivoted at 2 to the frame A. Brake shoes 3 are pivotally connected at 4 to the brake levers and are adapted to be moved into and out of frictional contact with the brake pulley 5 keyed to a shaft 6 which may be a motor shaft, or the shaft of a hoisting drum, or other apparatus to which the brake mechanism is applied. The brake shoes are applied by means of compression springs 7 which bear at their inner ends against annular shoulders 8 formed on the brake shoes. The outer ends of the brake springs 7 extend into stationary cup-shaped bearing members 9 which may be adjustably secured to the frame A by means of bolts 10.

An electromagnet M for releasing the brake shoes is mounted upon the frame A, and as herein shown, is adapted to be energized by a multiphase electric current. This magnet comprises a casing 11 having end plates 12 secured thereto. A stationary sleeve 13 extends longitudinally through the center of the magnet casing, and has its ends countersunk in the end plates 12. The magnet comprises a plurality of stationary coils 14 wound on spools 15 which are held stationary by clamp washers 16 mounted on the sleeve 13. The magnet armatures comprise end plates or disks 17 slidable on the sleeve 13 and laminated cores 18 secured to the end plates and adapted to enter the spools 15.

Pivoted at 19 to the upper ends of the brake levers are horizontal rods 20 extending into the sleeve 13. The armatures are secured to these rods 20 by pins 21 which extend through longitudinal openings 22 in the sleeve 13, these openings permitting the armatures to move in a horizontal direction.

Mounted on the rods 20 are stiff coil springs 23 adapted to bear, at their inner ends, against the outer faces of the end plates 12 of the magnet frame, and at their outer ends against washers 24 interposed between said springs and shoulders 25 formed on the rods 20. The spring 23 are of such length that they are only compressed during the final movement of the magnet armatures toward their attracted position. The washers 24 form a convenient means of adjustment whereby any desired tension of the springs 23 may be secured.

When the magnet M is deënergized the brake springs 7 hold the brake shoes against the brake pulley 5. At this time the springs 23 are loose on the rods 20 there being some play between these springs and the magnet frame. When the magnet is energized the armatures 17 are pulled inward, thereby operating the brake levers to compress the brake springs 7 and lift the brake shoes. During the initial movement of the brake levers the springs 23 are not compressed, but as the armatures approach each other and are brought into a position to exert a powerful magnetic pull, the springs 23 are compressed, and are held under compression until the brake magnet is again deënergized, at which time the tension of the springs is sufficient to effectually overcome any sticking due to residual magnetism independently of the main brake springs 7. These springs also prevent either armature from moving farther than the other, which sometimes happens when these springs are not used, in such case the armatures may be brought together with only one brake shoe released. The springs 23 furthermore serve to reduce or entirely eliminate the loud slamming noise that usually occurs in the operation of an alternating current magnet of this type owing to its quick and powerful action when energized.

The present invention, although shown in combination with brake apparatus, is also well adapted for use with electro-magnets for operating electric switches and various other mechanisms. The invention may also be applied to single phase alternating current magnets and direct current magnets.

I wish further not to be limited to the particular construction herein shown, as various changes in the details of construction and arrangement of parts might be made without departing from the spirit and scope of the invention.

What I claim as new and desire to secure by Letters Patent of the United States is:—

1. In brake apparatus, the combination with an electro-magnet, of an armature therefor, an elastic stop limiting the inward movement of the armature, said stop being inert at the beginning to perform its intended function and under compression at the final movement of the armature to attracted position, and brake mechanism connected to said armature.

2. In brake apparatus, the combination with an electro-magnet, of an armature therefor, a brake, a brake applying spring, connections between said armature and brake for releasing the latter and compressing said spring when the electro-magnet is excited, and a device yieldingly opposing the final movement of the armature toward its attracted position and maintaining an opposing pressure thereon while in such position.

3. In brake apparatus, the combination with an electro-magnet and its armature, of a brake spring opposing the movement of the armature toward its attracted position, and an additional spring inert at the beginning to perform its intended function and under compression at the final movement of the armature toward attracted position.

4. In brake apparatus, the combination with brake shoes, of brake applying springs, an electromagnet comprising magnet cores movable toward and from each other, connections between said cores and said brake shoes, and additional springs inert at the beginning to perform their intended functions and under compression at the final movement of said magnet cores toward attracted position.

5. In brake apparatus, the combination with an electro-magnet having its winding in a stationary or fixed position, of armatures associated with said winding and movable toward and away from each other, elastic means under tension to perform their intended function when the armatures are in attracted position and limiting the movement of the armatures toward each other and compelling each to move through substantially the same distance, and brake mechanism connected to the armatures.

6. In brake apparatus, the combination with an alternating current electromagnet with its winding in stationary or fixed position, of armatures associated with said winding and movable toward and away from each other, brake applying springs, means for limiting the movement of said armatures toward each other to compel each to move through substantially the same distance, said means being placed under tension when the armatures are in their attracted position, brake shoes, and connections between the brake shoes and said armatures.

7. In brake apparatus, the combination with a multiphase alternating current electromagnet having windings mounted in stationary or fixed position, of armatures movable toward each other upon excitation of said windings, springs opposing said movement, additional springs for cushioning said movements of the armatures and compelling them each to move through substantially the same distance, said springs being under tension to perform their intended function when the armatures are in their attracted position, and brakes operatively connected to said armatures.

8. In brake apparatus, the combination with a multiphase alternating current electromagnet having windings mounted in substantially fixed or stationary position, of armatures acted upon by said windings when excited with electric current to move toward each other, elastic devices retarding and then positively limiting the inward movements of said armatures, appliances for retracting said armatures to initial positions when said windings are unexcited, brake devices, and connections between said devices and the armatures.

9. In brake apparatus, the combination with a multiphase alternating current electromagnet having windings mounted in stationary or fixed position, of armatures movable toward and away from each other, appliances for retarding the movements of the armatures toward each other, means for positively limiting the last-named movements, brake apparatus released upon the excitation of said windings, and means for applying said brake apparatus and retracting said armatures when said windings are unexcited.

10. In brake apparatus, the combination with a brake, of an electromagnet for releasing the brake, means for overcoming residual magnetism and effecting an initial movement of the brake toward applied position when the electromagnet is deënergized and additional means for applying the brake.

11. In brake apparatus, the combination with a brake member, of a brake applying spring, an electromagnet comprising a movable member connected to said brake member for moving the latter to released position, and a stiff spring normally inert to perform its intended function but placed under tension by the movable member of the magnet during its final movement toward attracted position.

12. In brake apparatus, the combination with an electromagnet, of an armature therefor, an elastic stop inert to perform its intended function at the beginning of the inward movement of the armature and limiting said inward movement, brake mechanism connected to said armature, brake applying means, and adjusting means to vary the tension placed on said stop.

13. In brake apparatus, the combination with a support, of brake levers pivoted to said support, an electromagnet comprising a magnet frame mounted on said support, and armatures connected to the brake levers, brake shoes carried by the brake levers, a brake pulley, brake springs for applying the brake shoes to said pulley, and stiff springs inert at the beginning to perform their intended function and compressed during the final movement of the armatures to attracted position.

14. The combination with an electro-magnet, of an armature therefor, an elastic stop limiting the inward movement of the armature inert at the beginning to perform its intended function and placed under compression by the final movement of the armature to attracted position, a spring opposing the entire movement of the armature to attracted position, a brake, and connection between the brake and armature.

15. The combination with an electromagnet, of an armature therefor, means for retracting the armature when the magnet is deënergized, a device for yieldingly opposing the final movement of the armature toward its attracted position inert at the beginning to perform its intended function and placed under compression by said final movement, and a brake connected to the armature.

16. The combination with an electromagnet and its armature, of means for withdrawing the armature when the magnet is deënergized, a spring inert at the beginning to perform its intended function and opposing the final movement of the armature toward its attracted position and held under tension while the armature is in such attracted position, and brake mechanism connected to the armature.

17. The combination with an electromagnet having its winding in a stationary or fixed position, the armatures associated with said winding and movable toward and away from each other, elastic means inert at the beginning to perform its intended function and placed under tension when the armatures are in or near their attracted position and limiting the movement of the armatures toward each other and compelling them to move through substantially the same distance, and brake shoes operatively connected to the armatures.

18. The combination with an alternating current electromagnet having windings mounted in a stationary or fixed position, of armatures movable toward and from each other, springs inert at the beginning to perform their intended function and placed under compression by final movement of the armatures to attracted position and held under compression while the armatures are in attracted position, and brake levers connected to the armatures.

19. The combination with a support, of an electromagnet comprising a magnet frame mounted on said support, armatures for said magnet movable toward and from each other, stiff coil springs associated with said armatures and in position to be inert at the beginning to perform their intended functions and compressed by the final movement of the armatures to attracted position, and brake mechanism carried by said support and operatively connected to said armatures.

In testimony whereof, I have signed my name to this specification in the presence of two subscribing witnesses.

WILLIAM D. LUTZ.

Witnesses:
 August Sundh,
 John F. Rule.